United States Patent
Klein et al.

[11] Patent Number: 5,963,446
[45] Date of Patent: Oct. 5, 1999

[54] EXTENDED RELAY LADDER LOGIC FOR PROGRAMMABLE LOGIC CONTROLLERS

[75] Inventors: Michael T. Klein; William Perry Su; Richard Leroy Mahn, all of Arbor, Mich.; Per-Ola Gustav Forsgren, Solna, Sweden

[73] Assignee: Steeplechase Software, Inc., Ann Arbor, Mich.

[21] Appl. No.: 08/915,970

[22] Filed: Aug. 21, 1997

Related U.S. Application Data

[60] Provisional application No. 60/024,664, Aug. 27, 1996.

[51] Int. Cl.$^6$ ........................................ G05B 11/01
[52] U.S. Cl. ............... 364/147; 364/140.06; 364/140.07; 364/140.08; 364/188; 364/189; 364/190; 364/191; 364/192; 395/701
[58] Field of Search ..................... 364/147, 191, 364/188, 189, 192, 140.06, 140.07, 140.08; 395/701, 892

[56] References Cited

U.S. PATENT DOCUMENTS

| | | |
|---|---|---|
| 5,349,518 | 9/1994 | Zifferer et al. ................ 364/147 X |
| 5,553,297 | 9/1996 | Yonezawa et al. ............. 364/132 X |
| 5,717,588 | 2/1998 | Yamane et al. ................ 364/147 X |

*Primary Examiner*—Paul P. Gordon
*Assistant Examiner*—Peter W. Eissmann
*Attorney, Agent, or Firm*—Rader, Fishman & Grauer PLLC

[57] ABSTRACT

A digital computer implemented software system is provided for programming industrial logic controllers using a software package of the type utilizing relay ladder logic to represent control programs. The control program is executable by the controller to control the operation of one or more industrial devices. Using relay ladder logic, the control programmer is provided with a system to replace a coil with an ACTION block containing at least one complex expression. When the left side of the ACTION block is energized, the expression is evaluated. In a further embodiment, the programmer is able to replace a contact with a DECISION block containing a Boolean expression. When the left side of the DECISION block is energized, the Boolean expression is evaluated. If the expression evaluates as TRUE, the right side of the DECISION is energized.

12 Claims, 2 Drawing Sheets

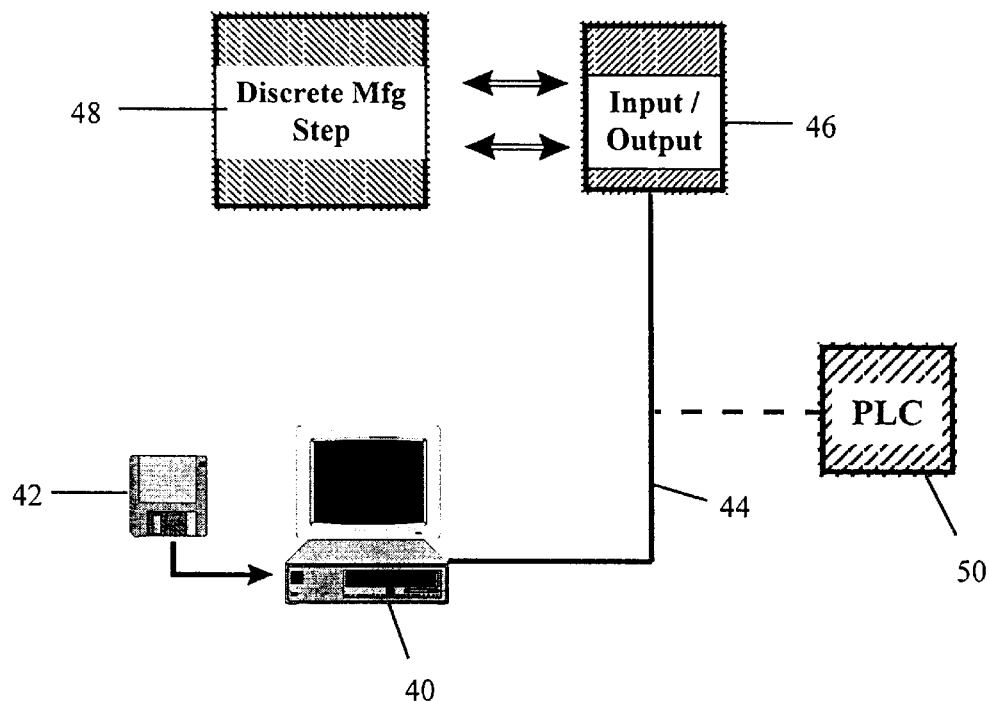
Figure 1
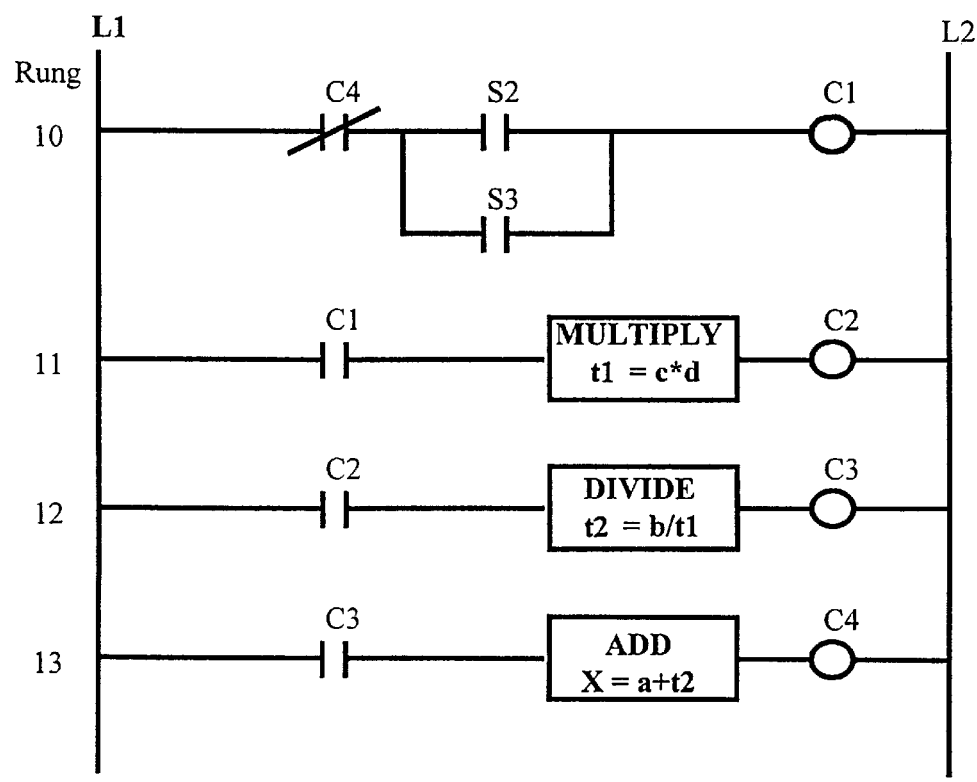
Figure 2 - Prior Art

EXTENDED RELAY LADDER LOGIC FOR PROGRAMMABLE LOGIC CONTROLLERS

This application is a continuation of provisional application No. 60/024,664 dated Aug. 27, 1996.

FIELD OF THE INVENTION

The present invention relates generally to the control of industrial equipment and processes. More particularly, the invention relates to an extension of the relay ladder logic language used to program programmable controllers which control industrial equipment and processes.

BACKGROUND OF THE INVENTION

Most industrial processes require a sequence of operations or steps in order to build a product. This is particularly true of discrete parts manufacture. The steps may occur at specific times and in a specified sequence according to specific parameters, or may occur in response to specific events. Each step may have one or more elements, each element describing activities or operations with greater specificity. The sequencing may be performed either manually or with some type of controller.

Up until the late 1960's, sequencing of discrete industrial operations and many other industrial operations usually was performed using a bank of relays uniquely wired to perform the particular task. Thus, the use of relay logic is well known in most industries. With the availability of semi-conductor logic functions, the electronic programmable logic controller (PLC) was developed. Since relay logic was so well known, the controller design engineers developed the PLC so that the same "language" of relay logic could still be used. However, because of the inherent complexity of ladder logic, programming of PLCs has traditionally been difficult, time consuming and error prone.

Each industrial process may be represented as a tabular construct, known as a ladder diagram, which displays each of the steps with its associated elements and parameters in relay ladder logic. The relay ladder logic referred to herein is a programming language in which input/output signals are written with symbols, such as electrical circuit symbols that conventionally represent relay contacts and relay coils. Also, for example, a processing function, such as "count up", is written with an instruction symbol mnemonic such as INC (Increment). In its most complex form, relay ladder logic is written as a series of Boolean operations and special purpose function blocks to perform non-Boolean activities like timing and counting. The more complex the function to be performed, the more extensive the set of Boolean operations necessary to perform that function. Because of the cryptic nature of ladder logic, it is inherently complex, difficult and time consuming to program and represent complex numerical instructions in ladder logic. In order to alleviate some of the complexity of tying together in series multiple Boolean operations to perform complex numerical operations, some commercial implementations combine high order text-based languages such as C, PASCAL, FORTRAN, ADA and LISP with relay ladder logic in order to simplify programming of complex numerical operations. However, the addition of high level languages to relay ladder programming increases the complexity of the programming task for the engineer. Further, a separate compiling step is required to combine the features of all languages used in a control program, and any debugging operation requires interpretation of several different programming codes, again increasing complexity for the programmer.

SUMMARY OF THE INVENTION

The present invention is directed to a software system which extends relay ladder logic language through the addition of language components taken from flowchart based languages to provide greatly improved expressive capability. In particular, a software system is disclosed for placing general expressions within ACTION blocks in a relay ladder logic program. The programmer is allowed to place an ACTION block in a program rung in place of a coil. When the left side of the ACTION block is energized, the contents of the ACTION block are executed. Thus, the programmer is allowed to perform math, string manipulation, or evaluate complex numerical statements within a single rung on a ladder diagram.

In a further embodiment, a programmer is allowed to place a DECISION block in a program in place of a contact. When the left side of the DECISION block is energized, the Boolean expression within the DECISION block is evaluated. If the Boolean expression within the DECISION block is true, then the right side of the DECISION block is energized. Using DECISION blocks thus allows a programmer to perform non-trivial expression evaluation within a single relay ladder logic rung.

Through the present invention, control program developers are provided with a software tool which decreases the complexity of combining complex numerical evaluation or expression evaluation within a control program written with relay ladder logic language. The present invention also relieves the programmer of using multiple languages to achieve a desired control process. Decreasing complexity means less time is required to implement that control program and productivity of the industrial process is enhanced. Thus, the manufacturer achieves faster design cycles at a lower down time than existing relay ladder logic language programming tools.

BRIEF DESCRIPTION OF THE DRAWINGS

The features and inventive aspects of the present invention will become more apparent upon reading the following detailed description, claims, and drawings, of which the following is a brief description:

FIG. 1 is a diagramatic block view of the hardware of the present invention.

FIG. 2 is a typical electrical ladder diagram as visualized through known relay ladder logic technology.

DETAILED DESCRIPTION OF A PREFERRED EMBODIMENT

Figure 3:
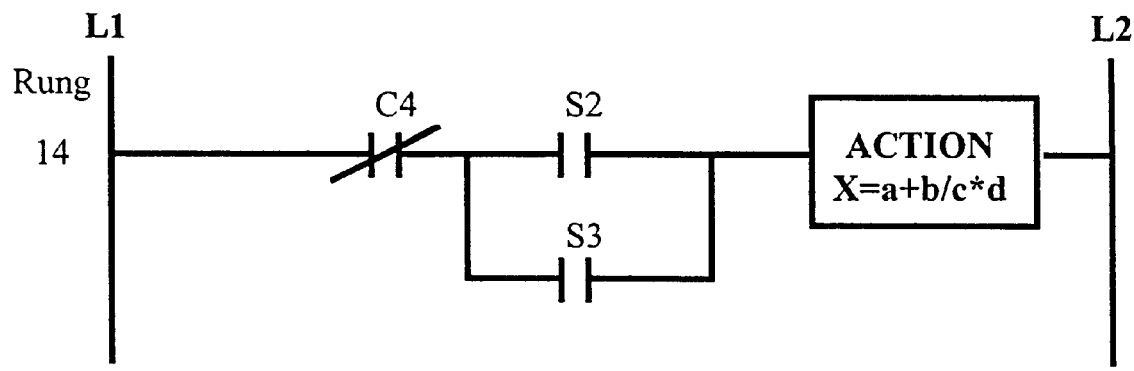
FIG. 3 is a first embodiment of the present invention which replaces the relay ladder logic,of FIG. 2.

Now referring to FIG. 1, the control program hardware apparatus is shown, including a digital computer 40 and controlling program software embodied by floppy disk 42. In a typical hardware arrangement, computer 40 is connected 44 to input/output device 46. Input/output device 46 is controlled via the control program software 42 and interacts with a discrete industrial step 48 which is a subpart of an industrial process. Each discrete industrial step 48 occurs at a predetermined time or in response to a predetermined parameter which is either supplied by or measured by input/output device 46 or both. Input/output device 46 thus provides the external stimuli to digital computer 40, in response to which the control program may cause other industrial events to occur. Alternatively, computer 40 interacts with input/output device 46 through a programmable logic controller 50 (as shown in broken lines).

Using known methods and commercially available control program software packages, an application engineer may construct a control program for an industrial application. Most commercially available software packages allow for a control program to be constructed using relay ladder logic language. FIG. 2 shows a typical relay ladder logic ladder diagram, arranged in such a way as to evaluate the simple arithmatic expression of Equation 1.

$$X = a + \frac{b}{c*d}$$ Equation 1.

According to the logic shown in FIG. 2, a series of Boolean operations are required to perform the complex mathematical function indicated. In rung 10 of FIG. 2, contact C4 is normally closed. In combination with normally closed contact C4, closing of either switch S2 or switch S3 will cause coil C1 to be activated. In this configuration, switch S2 could represent an automatic operation, while switch S3 could represent a manual operation. Rung 10 therefore represents the Boolean logic of Equation 2:

$$C1 \text{ IF } C4 \text{ AND } (S2 \text{ OR } S3)$$ Equation 2.

Upon activation of coil C1 in rung 10, contact C1 in rung 11 closes, thus energizing the left side of a prior art relay ladder logic function block, which is able to evaluate only a single function. For example, in order to express a non-trivial mathematical calculation (such as Equation 1) it is necessary to use individual function blocks for ADD, SUBTRACT, MULTIPLY and DIVIDE—arranged in the correct order—and temporary variables for intermediate results, as shown in FIG. 2. Thus, in rung 11, when the left side of the MULTIPLY function block is energized, the function block evaluates the function (c*d) and assigns the resulting value of that operation to temporary value t1. The final step of rung 11 is to energize coil C2, which closes contact C2 in rung 12. Rung 12 then proceeds to evaluate the DIVIDE function (b/t1), and assigns the resulting value to temporary variable t2. After evaluation of the DIVIDE function, coil C3 is energized, closing contact C3 in rung 13, and forcing evaluation of the ADD function block of rung 13. The ADD function (a+t2) is evaluated in rung 13, and the resulting value is assigned to variable X. Once the value of X is determined, coil C4 is energized, causing contact C4 of rung 10 to open, thereby causing a reset of rungs 10–13. Through these multiple Boolean steps, the control program of FIG. 2 evaluates the complex mathematical expression of Equation 1.

In FIG. 3, a first embodiment of the present invention is demonstrated in rung 14, which is able to replace rungs 10–13 of FIG. 2. According to the present invention, the relay ladder logic programmer is allowed to place an ACTION block in a program in place of a coil. In rung 14 as in rung 10, contact C4 is a normally closed position. Activation of either switch S2 or S3 energizes the left side of the ACTION block of rung 14. When the left side of the action block is energized, the contents of the ACTION are executed. In rung 14, Equation 1 is completely encoded within the ACTION block, which entirely replaces the four rungs of FIG. 2 prior art relay ladder logic diagram. Thus, the programmer is allowed to perform a complex mathematical action within a single rung of a ladder diagram program. According to the present invention, an ACTION may comprise one or more complex mathematical functions, string manipulations or any other input and output manipulations requiring a processing action. ACTION blocks may also contain compound statement expressions containing looping constructs, nested loops, if/then/else constructs, nested if/then/else constructs, or calls to external functions such as trigonometric calculations.

Figure 4:
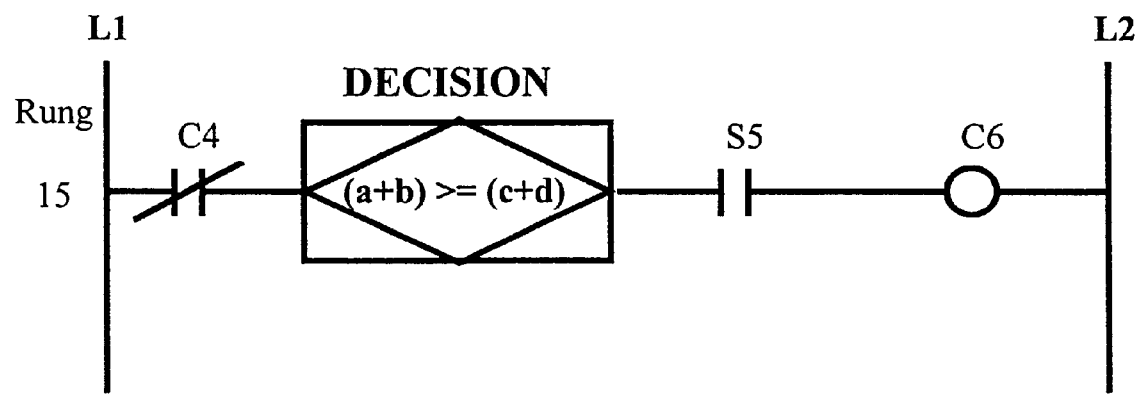
FIG. 4 is a second embodiment of the present invention.

In a related embodiment, as demonstrated in FIG. 4, the relay ladder logic programmer is allowed to place a DECISION block in a program in place of a contact. Rung 15 of FIG. 4 demonstrates one possible use of a DECISION block. In rung 15, contact C4 is in its normally closed position, thereby energizing the left side of the DECISION block. Within the DECISION block, the relay ladder logic programmer is allowed to place a Boolean expression or a set of Boolean expressions to be compared with each other. In the case of FIG. 4, the decision block is used to evaluate Equation 3.

$$(a+b) \geq (c+d)$$ Equation 3.

If the result of the DECISION block is true, which in FIG. 4 requires that the sum of (a+b) be greater than or equal to the sum of (c+d), then the right side of the DECISION block is energized, and any actions to the right of the DECISION block will take place. In rung 15, a combination of a true statement within the decision block and the closing of switch S5 enables the energization of coil C6.

Use by the relay ladder logic programmer of an ACTION block as demonstrated in FIG. 3 or of a DECISION block as demonstrated in FIG. 4 allows the programmer to take non-trivial actions or evaluate non-trivial expressions within a single rung on a ladder diagram. The advantages over the prior art ladder diagram as shown in FIG. 2 are evident. Instead of requiring a series of simple Boolean expressions, the present invention allows the programmer to enter a single rung to achieve a result equal to that achieved with several rungs of prior art relay ladder logic programming, Furthermore, whereas evaluation and debugging the ladder diagram of FIG. 2 is complex, the ladder diagrams of FIGS. 3 and 4 are comparatively simple and easy to understand. The relay ladder logic programmer therefore reduces the amount of time it takes to enter the relay ladder logic language code into the programmable controller, reducing the amount of time the programmer spends in developing the control program. By reducing the amount of time spent programming, evaluating and debugging a control program, implementation of that control program is hastened and productivity of the software implementation increases. Thus, the programmer may achieve faster software implementation and less manufacturing down time than that currently afforded by existing relay ladder logic programming technology. Additionally, simplification of relay ladder logic language programming reduces the need of the control programmer to rely on methods of programming which combine high order text based languages with relay ladder logic in order to simplify programming of complex numerical operations. Because only a single language is used, i.e., relay ladder logic language, knowledge of multiple languages is no longer required to program a programmable controller and separate compilation steps are not required to combined the features of all of the languages used in the controlled program. Reducing the number of different languages used to program a programmable controller also simplifies the programming task and results in efficiency gains in implementing software and manufacturing changes.

Preferred embodiments of the present invention have been disclosed. A person of ordinary skill in the art would realize, however, that certain modifications would come within the teachings of this invention. Therefore, the following claims should be studied to determine the true scope and content of the invention.

What is claimed is:

1. In a computer implemented software system for programming a software package of the type utilizing relay ladder logic to represent control programs, the control program executable by the controller to control the operation of one or more devices, the improvement which comprises:

(a) replacing a coil with an ACTION block, said ACTION block containing at least one general expression; and (b) evaluating said general expression within said ACTION block when the left side of said ACTION block is energized.

2. A computer implemented software system as recited in claim 1, wherein said general expression is an input or output manipulation requiring a processing action by the controller.

3. A computer implemented software system as recited in claim 2, wherein said input or output manipulation is a complex mathematical function or a string manipulation.

4. A computer implemented software system as recited in claim 3, wherein said input or output manipulation includes at least one compound statement expression.

5. A computer implemented software system as recited in claim 1, further comprising the steps of:

(c) replacing a contact with a DECISION block, said decision block containing a Boolean expression; and (d) energizing the right side of said DECISION block when the left side is energized and said expression evaluates as true.

6. A computer readable storage device used to direct an on-site computer to implement a software system for programming controllers using a software package of the type utilizing relay ladder logic to represent control programs, the control program executable by the controller to control the operation of one or more devices, the improvement which comprises:

(a) translating programming information into a graphical relay ladder logic diagram, said diagram including a contact and a coil;

(b) replacing a coil with an ACTION block, said ACTION block containing at least one general expression; and (c) evaluating said general expression within said ACTION block when the left side of said ACTION block is energized.

7. The device of claim 6, wherein said general expression is an input or output manipulation requiring a processing action by the controller.

8. The device of claim 7, wherein said input or output manipulation is a complex mathematical function or a string manipulation.

9. The device of claim 8, wherein said input or output manipulation includes at least one compound statement expression.

10. The device of claim 6, further including the steps of (d) replacing a contact with a DECISION block, said decision block containing a Boolean expression; and (e) energizing the right side of said DECISION block when the left side is energized and said expression evaluates as true.

11. In a computer implemented software system for programming controllers using a software package of the type utilizing relay ladder logic to represent control programs, the control program executable by the controller to control the operation of one or more devices, the improvement which comprises:

(a) means for translating programming information into a relay ladder diagram, said relay ladder diagram including at least one coil and at least one contact;

(b) means for displaying the relay ladder diagram on a digital computer video display screen during programming of the controlled application;

(c) means for replacing a coil with an ACTION block, said ACTION block containing at least one general expression;

(d) means for evaluating said general expression within said ACTION block when the left side of said ACTION block is energized.

12. The system of claim 11, further including:

(e) means for replacing a contact with a DECISION block, said decision block containing a Boolean expression; and (f) means for energizing the right side of said DECISION block when the left side is energized and said expression evaluates as true.

* * * * *